June 7, 1927.

H. P. ANDREOLI

TRANSFORMER

Filed Feb. 11, 1925

1,631,393

INVENTOR
H. P. Andreoli
BY C. P. Goepel
His ATTORNEY

Patented June 7, 1927.

1,631,393

UNITED STATES PATENT OFFICE.

HENRY P. ANDREOLI, OF LONG BEACH, NEW YORK.

TRANSFORMER.

Application filed February 11, 1925. Serial No. 8,358.

This invention relates to transformers adapted for bell-ringing or signal circuits.

Heretofore when changes were made in houses in order to adapt the bell-ringing or signal circuits thereof to the lighting circuit, it was necessary to supply bell-ringing transformers and connect these with the lighting circuit, and for this purpose the wires of the transformers were then suitably connected with the outlet box, but the transformers being outside of the outlet box, provided a very unsightly and to some extent, dangerous electrical connection. This was also true where the transformer was connected up with a condulet.

The object of my invention is to provide a transformer which may be tightly connected with an outlet box or condulet, and for this purpose the object of my invention consists in having integrally connected with the casing of the bell-ringing transformer, a screw-threaded nipple. So provided, the screw-threaded nipple may be readily joined with an outlet box and thereby be substantially part thereof and avoid the use of the objectionable wires heretofore referred to.

My invention consists in providing a transformer casing with a screw-threaded nipple permanently secured thereto, said nipple being adapted to be joined with an outlet box or with a condulet, as will be hereinafter described.

My invention will be further shown in the drawings and hereinafter described, and finally pointed out in the claims.

Similar characters of reference indicate corresponding parts throughout the various views.

Figure 1:
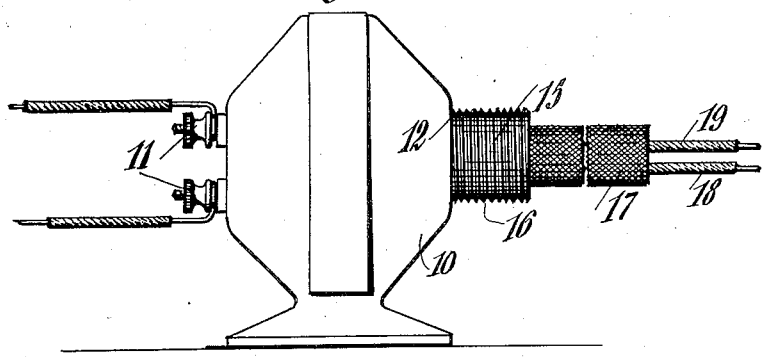
Figure 1 is a side view of my improved transformer casing provided with the improved nipple thereon.
Figure 2:
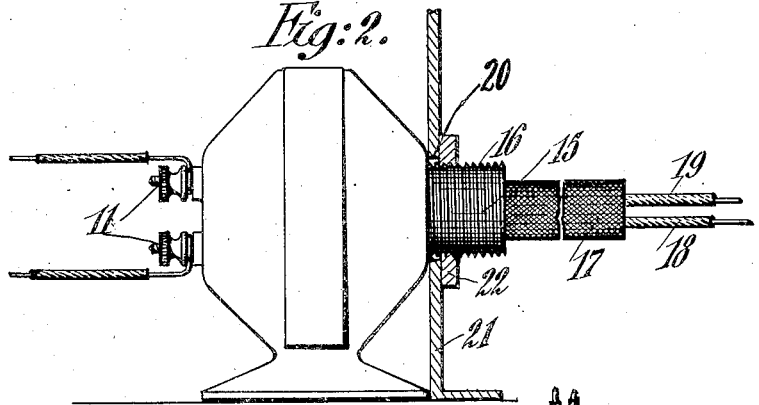
Fig. 2 shows the manner of its application to an outlet box.
Figure 3:
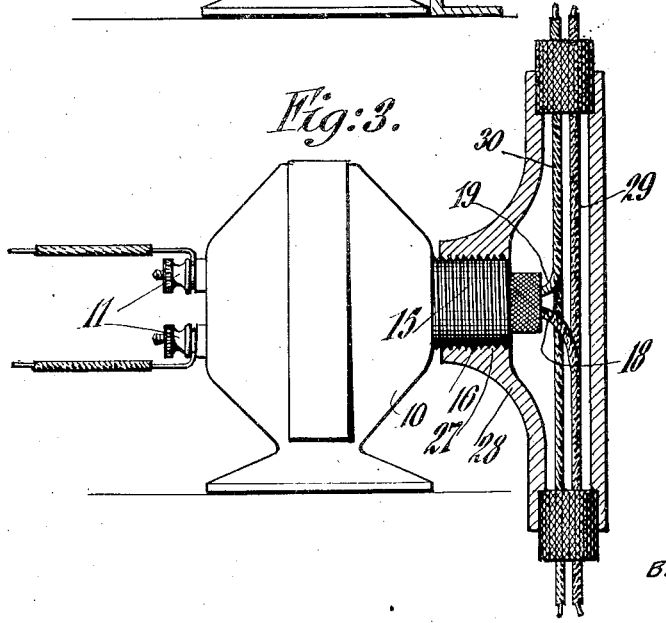
Fig. 3 shows the manner of its application to a condulet.

Referring to the drawings and particularly to Fig. 1, the transformer casing is indicated by 10, having its secondary terminals 11 at one side thereof. Within the transformer casing an opening 12 is provided, and to the walls forming the opening is secured or integrally formed therewith a nipple 15, having screw-threads 16 on the exterior thereof. The transformer casing 10 may be provided with a screw-threaded opening, into which the screw-threads 16 of the nipple engage, the essential feature, however, being that the nipple is permanently secured to the casing. The conduit 17 having the conducting wires 18 and 19 therein pass out from the transformer casing and through screw-threaded nipple 16, as shown in Fig. 1.

When it is desired to connect a bell-ringing circuit of a house to the lighting circuit, all that is necessary is to take this transformer with the improved screw-threaded nipple 16 as part thereof and insert the wires 18 and 19 and insulation 17, and nipple 16 into an opening 20 of the outlet box 21. The lock nut 22 within the outlet box is then passed over the exterior of the nipple 15 and thereby the transformer casing is securely fastened to the wall of the outlet box 21.

In the event that it is desired to connect the transformer casing directly to the condulet, the screw-threaded portion 16 of the nipple is engaged with the interior screw threads 27 of the condulet 28 and the wires 18 are spliced to the wire 29, and the wire 19 spliced to the wire 30 within the condulet 28.

By the arrangement described, a very compact connection is obtained doing away entirely with the loose wires and of insecure electrical connections, and a great saving of time is obtained.

Among the advantages are:—

First, and chiefly, the provision of a connection for small bell-ring or signal transformers and the like with standard metal conduit and metal box wiring which does away with the exposure of the lighting potential current conductors and avoids any danger incident to exposed wires. A further advantage is that a safe connection with such devices may be made more quickly and the provision of the nipple provided means for securing the transformers directly with the standard metal conductor members wherein the conductors are connected and the whole presents a more finished appearance.

I have shown various embodiments of my invention but it is clear that changes may be made therein without departing from the spirit of the invention as defined in the following claims.

What is claimed as the invention and is desired to be secured by Letters-Patent is:

1. A transformer casing having terminals at one side thereof for the secondary winding of the transformer and provided at its opposite side with a projecting guide nipple for leads connected with the primary winding of the transformer, and said nipple provided with means for rigidly connecting the same with the wall of an outlet box or conduit member.

2. A "bell-ringing" transformer comprising a transformer having a primary winding to be connected with a lighting or power supply circuit and a secondary winding for furnishing current at a reduced potential, a metal casing for said transformer, terminal connectors for the low potential winding mounted on one side of the transformer casing, the casing having an aperture through the opposite side thereof through which leads from high potential winding project, and a nipple member extending from said casing opening and surrounding said leads whereby the transformer may be connected with standard metal condulet members and outlet boxes.

In testimony that I claim the foregoing as my invention, I have signed my name hereto.

HENRY P. ANDREOLI.